(12) United States Patent
Honeycutt

(10) Patent No.: US 8,046,858 B2
(45) Date of Patent: Nov. 1, 2011

(54) GANGWAY HANDRAIL AND METHOD FOR MANUFACTURING THE SAME

(75) Inventor: Robert W. Honeycutt, Pawleys Island, SC (US)

(73) Assignee: Safe Rack LLC, Andrews, SC (US)

( * ) Notice: Subject to any disclaimer, the term of this patent is extended or adjusted under 35 U.S.C. 154(b) by 69 days.

(21) Appl. No.: 12/552,811

(22) Filed: Sep. 2, 2009

(65) Prior Publication Data
US 2011/0047724 A1    Mar. 3, 2011

(51) Int. Cl.
*E01D 101/40*    (2006.01)
*E01D 1/00*    (2006.01)
(52) U.S. Cl. .......................................... 14/69.5
(58) Field of Classification Search ............... 14/69.5
See application file for complete search history.

(56) References Cited

U.S. PATENT DOCUMENTS

| | | | | |
|---|---|---|---|---|
| 4,053,140 A * | 10/1977 | Clemens et al. | ................. | 256/19 |
| 4,892,292 A * | 1/1990 | Russell | ............................ | 256/66 |
| 4,930,754 A * | 6/1990 | Caron et al. | ................ | 256/65.05 |
| 5,303,900 A * | 4/1994 | Zulick et al. | ................ | 256/65.05 |
| 5,794,292 A * | 8/1998 | Ricci, Jr. | ......................... | 14/69.5 |
| 6,009,586 A * | 1/2000 | Hawkes et al. | ...................... | 14/4 |
| 6,681,432 B1 * | 1/2004 | Reinhold | ....................... | 14/69.5 |
| 7,383,600 B2 * | 6/2008 | Carrigan | ........................ | 14/71.1 |
| 2007/0101516 A1 * | 5/2007 | Carrigan | ........................ | 14/69.5 |
| 2009/0144916 A1 | 6/2009 | Honeycutt et al. | | |
| 2009/0300860 A1 * | 12/2009 | Campbell | ....................... | 14/72.5 |

OTHER PUBLICATIONS

Co-pending U.S. Appl. No. 29/342,583, filed Aug. 27, 2009.

* cited by examiner

*Primary Examiner* — Raymond Addie
(74) *Attorney, Agent, or Firm* — Nelson Mullins Riley & Scarborough LLP

(57) ABSTRACT

A handrail for a gangway and a method for manufacturing the same where the handrail comprises a single, continuous piece of plastic.

9 Claims, 35 Drawing Sheets

GANGWAY HANDRAIL AND METHOD FOR MANUFACTURING THE SAME

FIELD OF THE INVENTION

The present invention relates generally to fall restraint equipment components. More particularly, the present invention relates to handrails for gangways.

BACKGROUND OF THE INVENTION

FIG. 1 illustrates an example of fall restraint equipment 100 comprising a stairwell 102, a platform 104, handrails 106, and a gangway 108. Stairwell 102 ascends to platform 104, where gangway 108 is connected. An optional cage 110 may be connected to gangway 108 if desired. Handrails 106 are located on the sides of platform 104 that are not connected to either gangway 108 or stairwell 102 in order to prevent a user from proceeding in a direction from the platform that does not lead to the gangway or the stairwell. In this example, the fall restraint equipment provides a user with access to a top 112 of a container 114 (such as a railway car).

FIG. 2 illustrates a gangway 200 that may be used as gangway 108 of FIG. 1. Gangway 200 comprises a base tread 202, which includes two posts or "uprights" 204 connected to base tread support 206. Uprights 204 are typically welded to base tread support 206 but may be connected to the support by other suitable means, such as by bolting. Base tread 202 is conventionally connected to a fixed structure, such as platform 18 (FIG. 1). A support structure or "underbody" 208 is pivotally connected to base tread support 206 at one end and is pivotally connected to another tread 210, such as a seatainer tread, at the other end. Seatainer tread 210 is comprised of uprights 212 and 214 connected to each side of a tread support 216. Each set of uprights 212 and 214 are interconnected by lateral posts 218 and 220. Lateral posts 218 and 220 may be referred to as "joiners," "connectors," or "spacer tubes." In this example, gangway 200 additionally comprises a pair of self-leveling supports 222 pivotally connected to underbody 208. Uprights 212 include top portions 226 that are configured to pivotally receive respective portions of a pair of handrails 224. Likewise, uprights 204 are configured to pivotally receive opposite ends of handrails 224. Gangway 200 may comprise additional components, such as a pair of supports, handrails, or "blocking rails" 228, as desired or needed.

FIG. 3 is a side view of a handrail 300 that may be used as handrail 224 of FIG. 2. Handrail 300 comprises a main body portion 302, a handle portion 304, a pair of end caps 306, a pair of lugs 308, and a pair of bronze bushings 310. Main body portion 302 is a metal tube that is sawed to a specific size from larger metal tubing stock material. As should be understood by those of ordinary skill in the art, the length of main body portion 302 depends on the size of the gangway to which it is attached. Similarly, handle portion 304 is manufactured from a metal tube exhibiting a diameter relatively smaller than that exhibited by the metal tubing used to manufacture main body portion 302. The metal tube is sawed to a specific size from larger stock material and is then bent near both ends at approximately 45° angles. The ends of handle portion 304 are then welded to main body portion 302.

Lugs 308 are also manufactured from larger pieces of stock metal. The stock metal is typically rectangular by nature and must therefore be plasma cut to form lugs 308. Each of lugs 308 is additionally plasma cut in order to define an aperture within the lug. Bronze bushings 310 are then pushed into the aperture, and lugs 308 are welded to main body portion 302. Ends caps 306 are specifically manufactured to fit the distal ends of main body portion 302. After caps 306 have been applied to the ends of main body portion 302, they are welded to the main body portion. Handrail 300 is then powder coated, which also requires heating the handrail. Lugs 308 and bronze bushings 310 are designed to allow handrail 300 to be connected to a gangway. Referring to FIGS. 2 and 3, for instance, the top portions of uprights 204 and 212, such as portions 226, are configured to receive lugs 308. For example, a connecting mechanism such as a carriage bolt or rod is inserted through apertures defined in one side of top portions 226, through bronze bushings 310, and through apertures defined in the other side of the top portions. Handrail 300 is connected to gangway 200 in this manner.

Manufacturing handrail 300 in this manner is both time-consuming and costly. Additionally, the drilling and cutting of the stock materials must be accomplished with precision in order to create a stable end product. Variances greater than an acceptable level render the smaller pieces unusable, which are typically discarded as it is often unfeasible to use them in another product once they have been drilled or cut. Moreover, if other parts cannot be cut or drilled from the remaining portions of the stock materials, they too are discarded. Further, different types and sizes of the metal stock material must be kept on hand in order to form the components of handrail 300 to be welded together. The inefficient yet inescapable use of stock material also increases the costs associated with manufacturing handrail 300.

FIG. 4 illustrates an exemplary rotational molding process for creating a product comprised primarily of plastic. The rotational molding process consists of four separate steps. First, a hollow mold is made of the desired end product. Next, the mold is filled with a predetermined amount of polymer powder or resin. The powder can be pre-compounded to the desired color of the end product. Typically, the powdered resin is polyethylene, polyvinyl chloride ("PVC"), or nylons. An oven is preheated by convection, conduction, radiation, or any other suitable means to a temperature ranging between 500 and 700° F. (260 to 370° C.) depending on the polymer used. Once the powder is loaded into the mold, the mold is closed, locked, and loaded into the oven.

Inside the oven, the mold is rotated about two axes so that the polymer melts and coats the inside of the mold. The rotation speed is relatively slow, such as less than 20 rotations per minute. Those of ordinary skill in the art should understand that the process does not involve centrifugal rotation. Alternatively, the polymer may be melted before rotation of the mold begins. It should be further understood that if the mold is heated for too long a period of time, the polymer will degrade, thereby reducing its impact strength. In contrast, if the mold is heated for too short of a period of time, the polymer will not melt completely and will not fully coalesce on the mold's walls. As a result, large bubbles may be created within the end product. Those of ordinary skill in the art should understand that the amount of time the mold should be heated depends on certain variables including the shape, size, and configuration of the mold, as well as the polymer used. Heat transfer causes the plastic charge inside the mold to melt and uniformly coat or fill the interior of the mold. Additionally, applying a small amount of pressure internally to the mold during the heating process accelerates coalescence of the polymer. As a result, the end product is produced with fewer bubbles and in less time.

Once the heating process is complete, the mold is removed from the oven and cooled, which is typically accomplished though the use of fans. However, water cooling or a combination of the two may be used. Cooling allows the polymer to solidify to the desired shape, as well as shrink slightly so that it may then be handled and removed from the mold. As should be understood, the amount of time required to cool the polymer varies depending on the shape, size, and configuration of the mold, as well as the type of polymer used and the temperature to which it has been heated. It should be further understood that cooling the polymer at a pace too rapid may cause the polymer to shrink too fast and warp the end product.

Once the polymer has cooled sufficiently to be handled so that it can retain the end product's shape, the mold is opened and the product is removed. The process may then be repeated by adding the polymer powder to the mold and repeating.

SUMMARY OF THE INVENTION

The present invention recognizes and addresses the foregoing considerations, and others, of prior art construction and methods.

In this regard, one aspect of the invention provides a method for manufacturing a handrail for a gangway. The method comprises the steps of providing a mold comprising a cavity, where the cavity corresponds to a shape of the handrail, filling the mold with a polymer, heating the mold, rotating the mold, cooling the mold, and removing the handrail from the mold.

According to another aspect, the present invention provides a gangway comprising an underbody support structure, a first support surface connected to an end of the underbody support structure, a second support surface connected to another end of the underbody support structure, a left handrail, and a right handrail. A first support surface first upright extends from one side of the first support surface and a first support surface second upright extends from another side of the first support surface. A second support surface first upright extends from one side of the second support surface and a second support surface second upright extends from another side of the second support surface. One end of the left handrail is connected to the first support surface first upright and another end of the left handrail is connected to the second support surface first upright. One end of the right handrail is connected to the first support surface second upright and another end of the right handrail is connected to the second support surface second upright. The right handrail is a single, continuous piece of plastic.

Yet another aspect of the present invention provides a handrail for a gangway. The gangway comprises a single, continuous piece of plastic. The single, continuous piece of plastic comprises an elongated, generally cylindrical main body portion and a first tab extending from the elongated, generally cylindrical main body portion. The first tab is adapted to be received by a first portion of the gangway and defines a first aperture through which a first connecting mechanism is passed in order to connect the handrail to the gangway.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

A full and enabling disclosure of the present invention, including the best mode thereof directed to one of ordinary skill in the art, is set forth in the specification, which makes reference to the appended drawings, in which.

Figure 1:
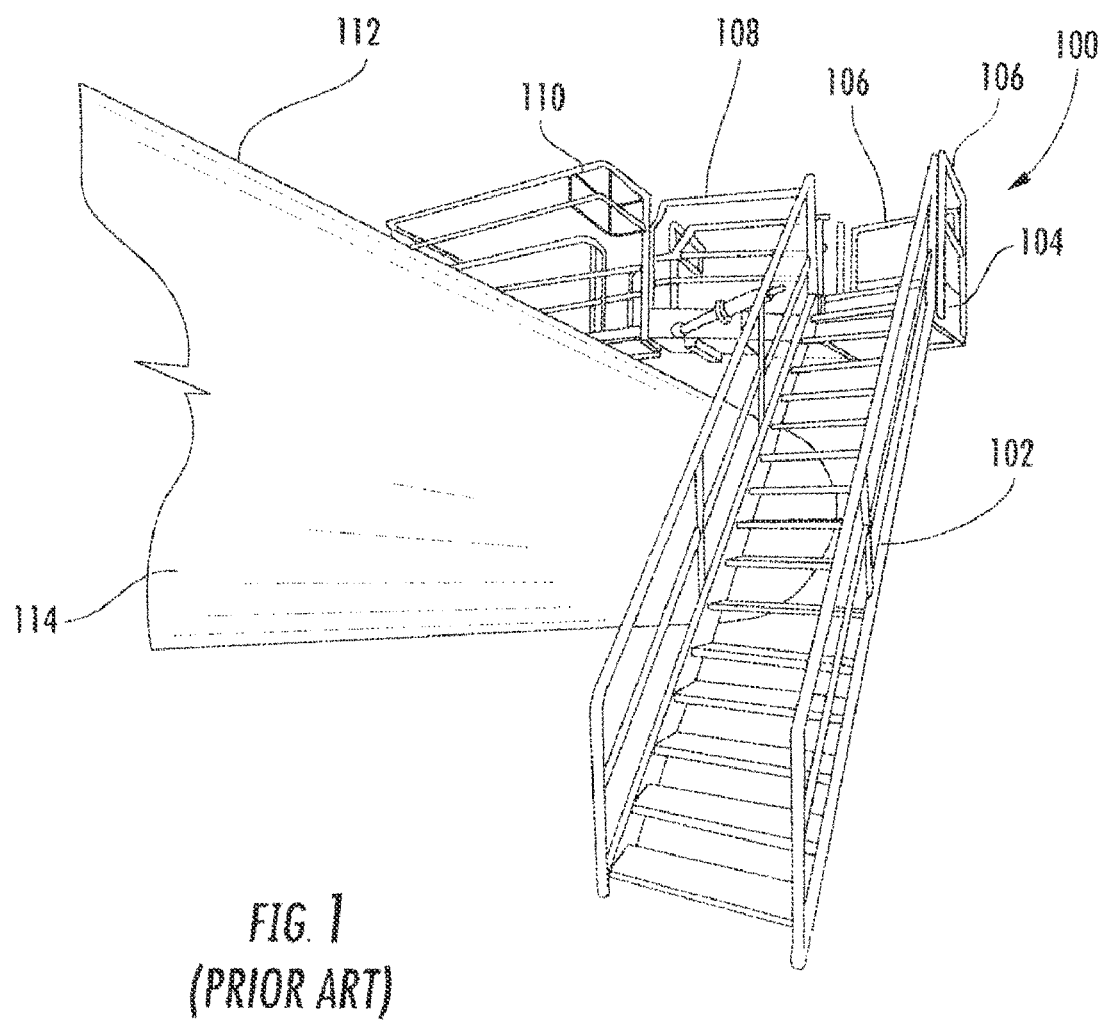
FIG. 1 is a perspective view of an exemplary fall restraint system.
Figure 2:
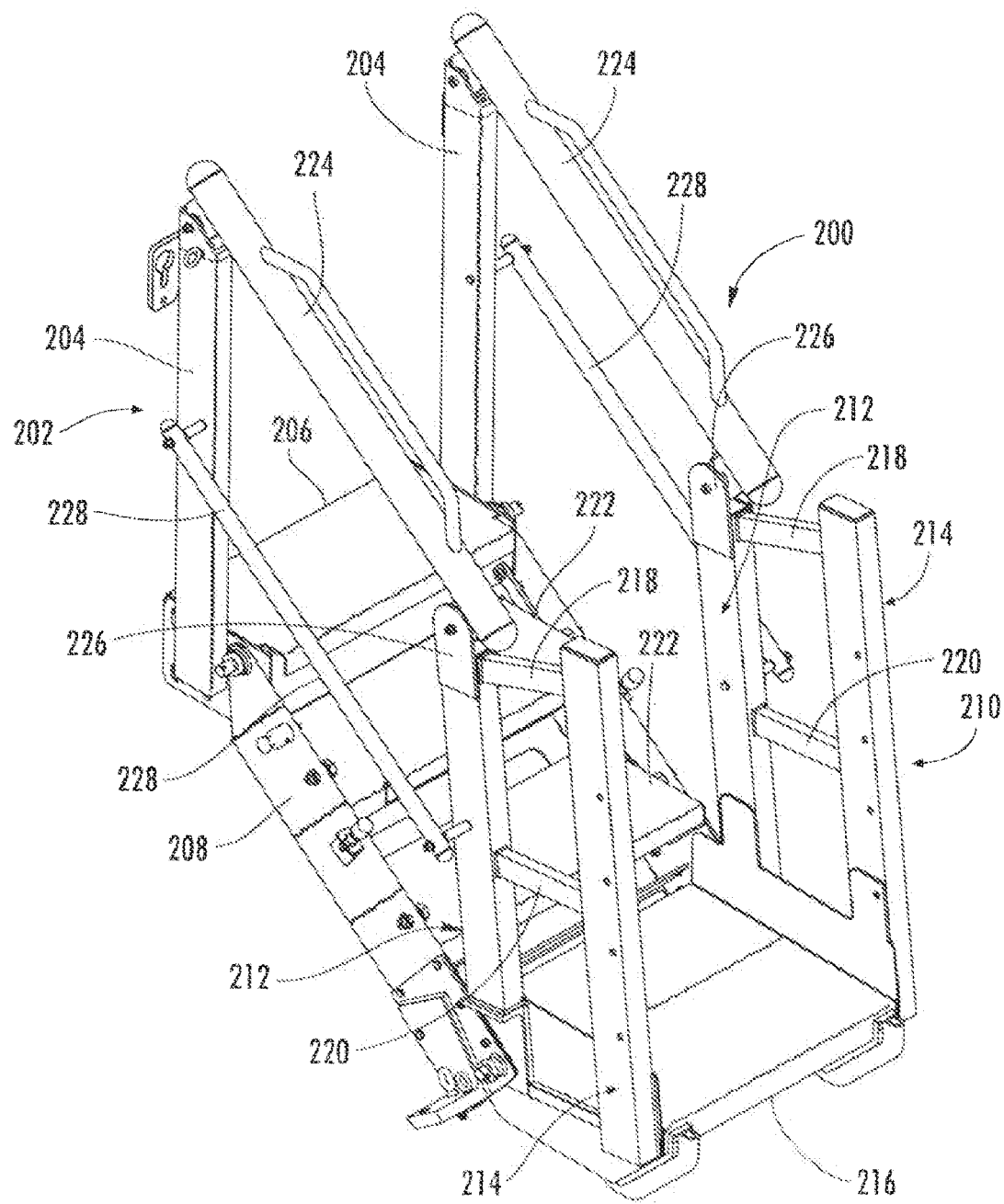
FIG. 2 is a perspective view of an exemplary gangway that may be used in the system of FIG. 1.
Figure 3:
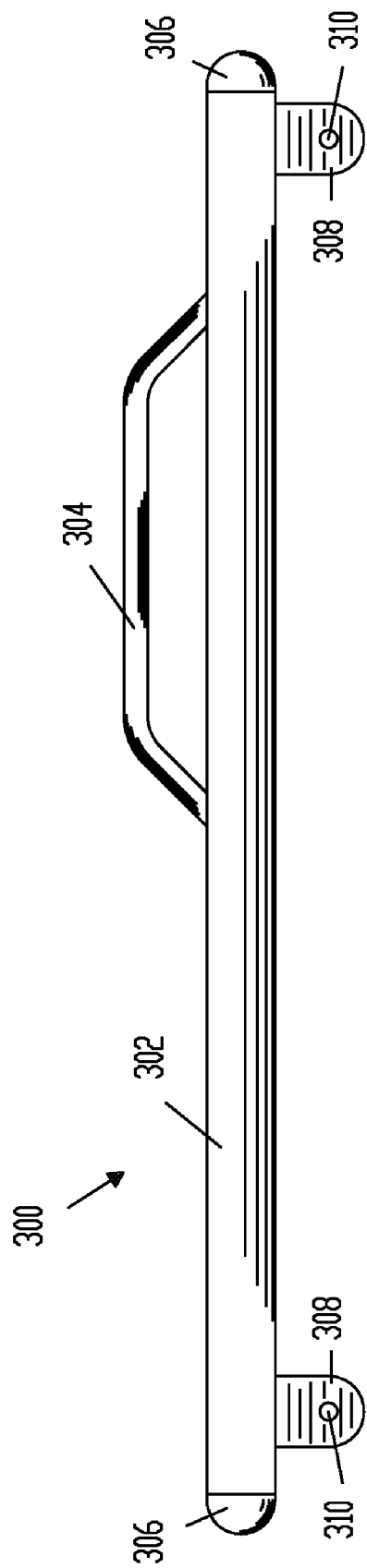
FIG. 3 is a side view of an exemplary handrail that may be used in the gangway of FIG. 2.
Figure 4:
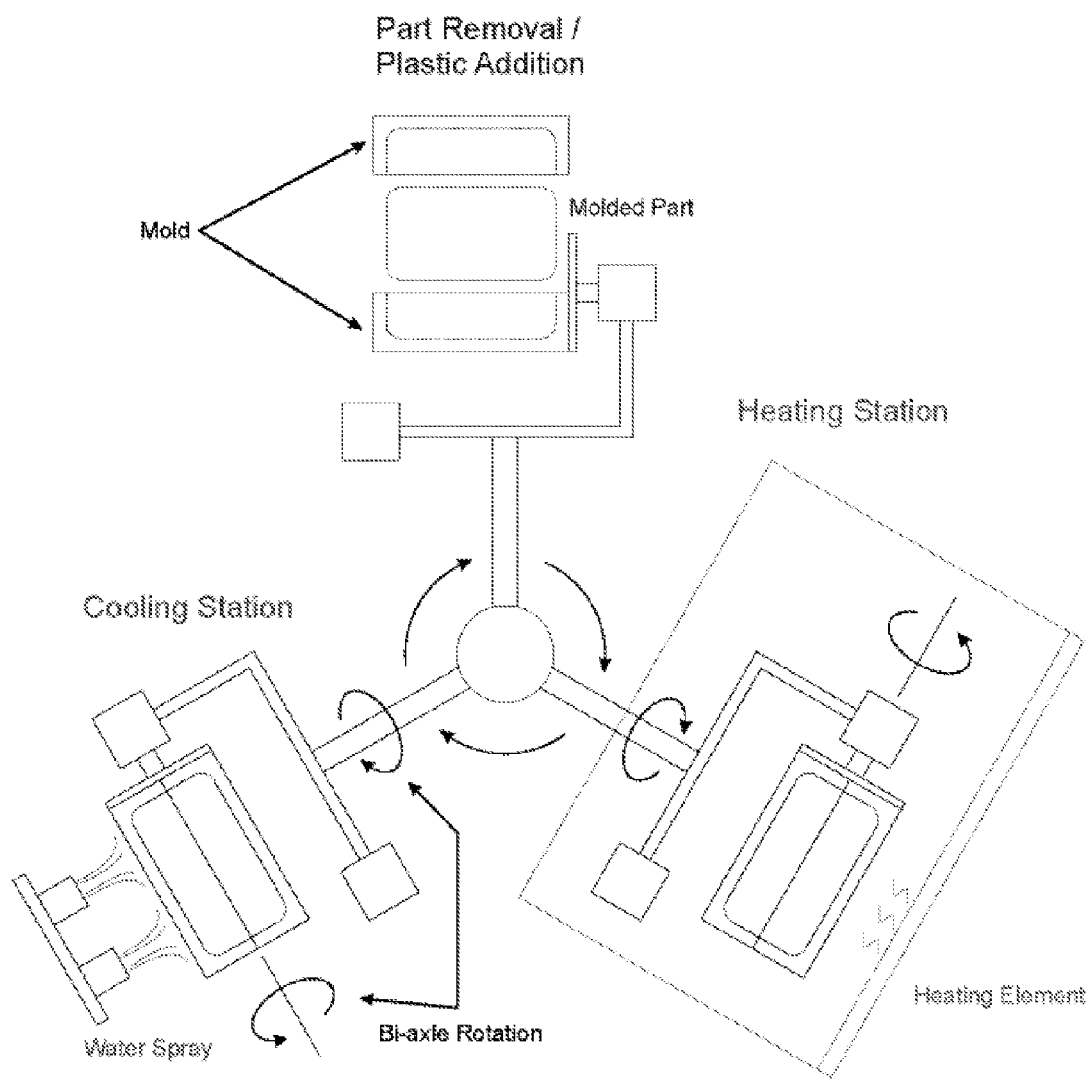
FIG. 4 is a schematic illustrating an exemplary process for a rotational molding process.

Repeat use of reference characters in the present specification and drawings is intended to represent same or analogous features or elements of the invention.

DETAILED DESCRIPTION OF PREFERRED EMBODIMENTS

Reference will now be made in detail to presently preferred embodiments of the invention, one or more examples of which are illustrated in the accompanying drawings. Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Figure 5:
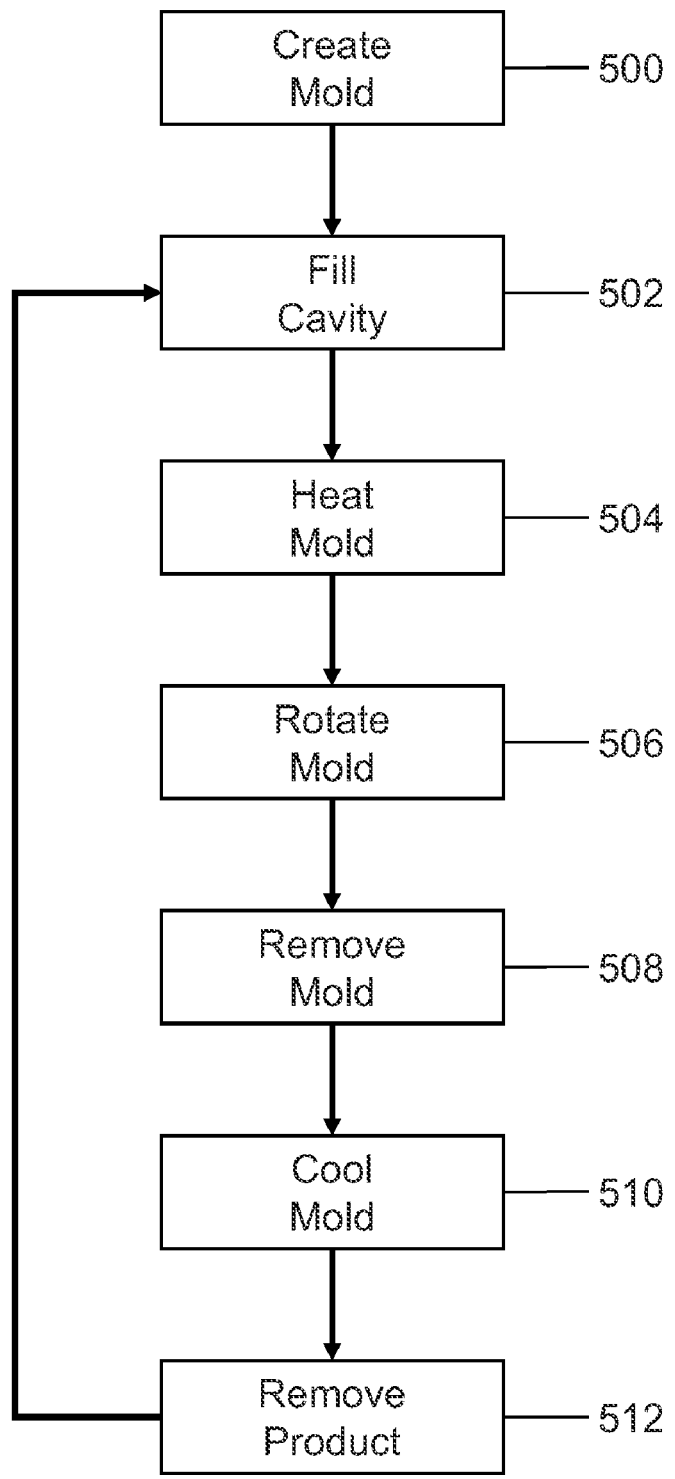
FIG. 5 is a flowchart illustrating an exemplary process for manufacturing a handrail in accordance with an embodiment of the present invention.
Figure 6:
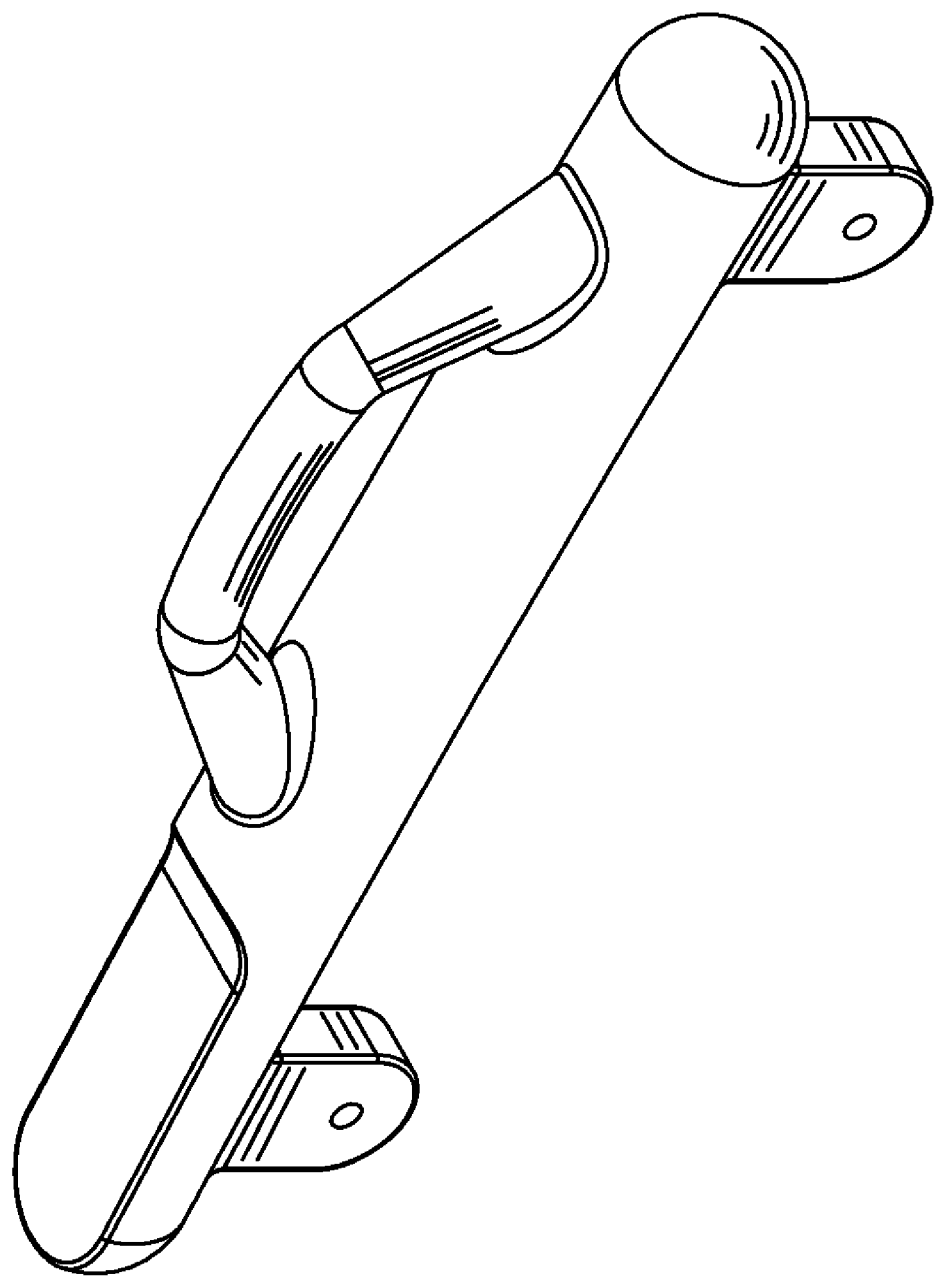
FIG. 6 is a perspective view of a gangway handrail in accordance with an embodiment of the present invention.
Figure 7:
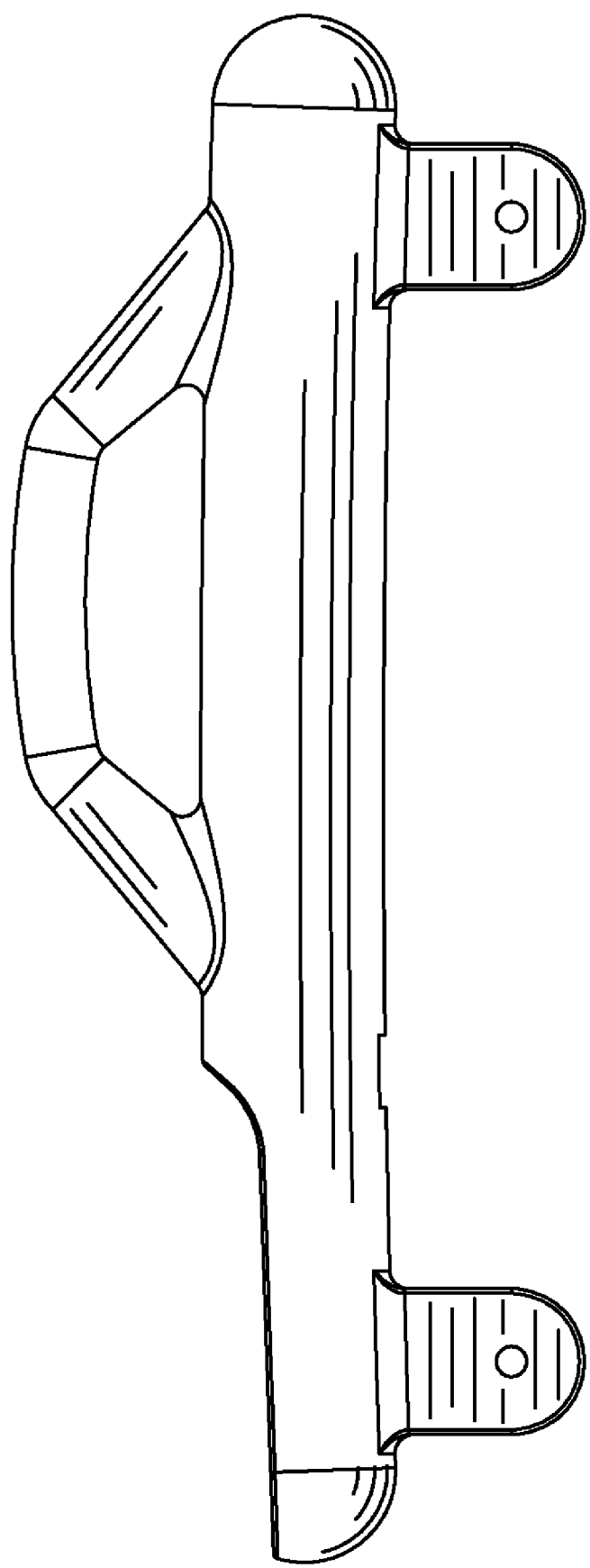
FIG. 7 is a side elevation view of the gangway handrail of FIG. 6.
Figure 8:
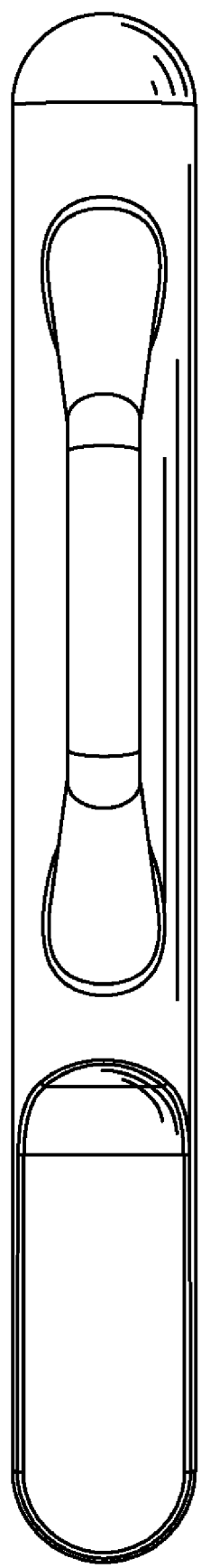
FIG. 8 is a top plan view of the gangway handrail of FIG. 6.
Figure 9:
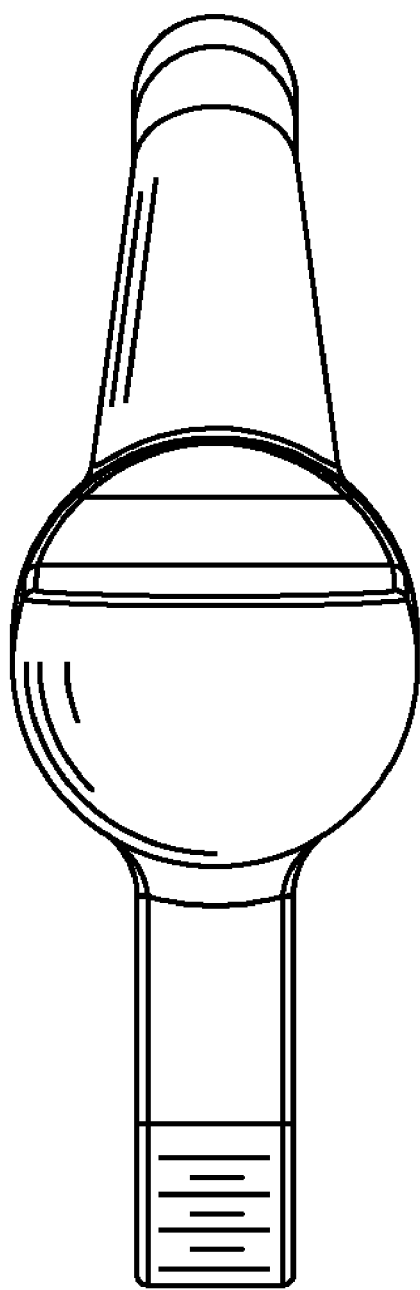
FIG. 9 is a front plan view of the gangway handrail of FIG. 6.
Figure 10:
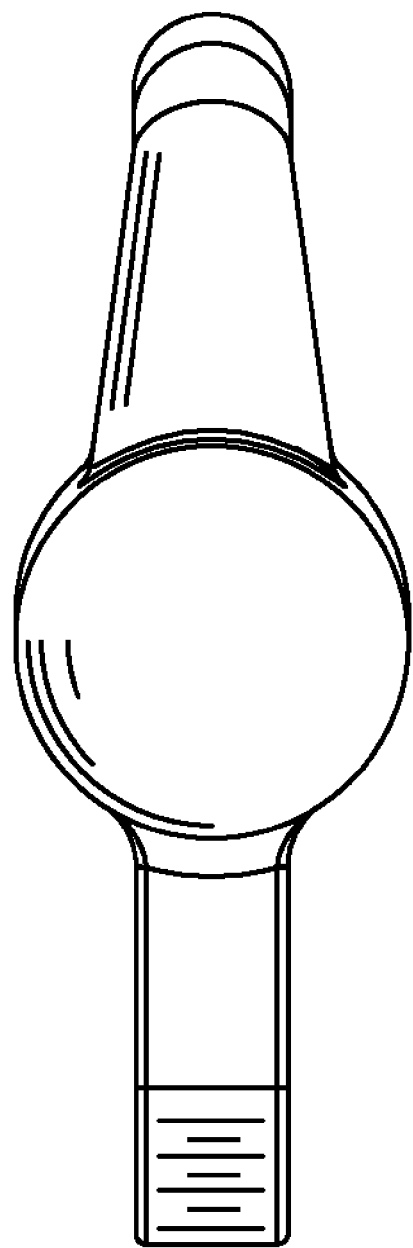
FIG. 10 is a rear plan view of the gangway handrail of FIG. 6.
Figure 11:
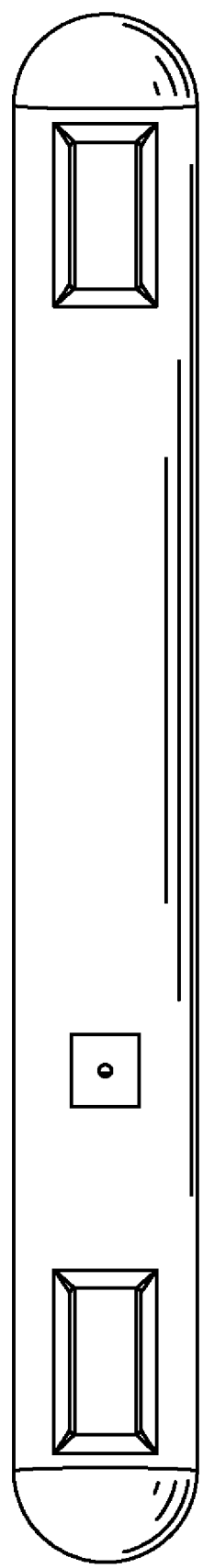
FIG. 11 is a bottom plan view of the gangway handrail of FIG. 6.
Figure 12:
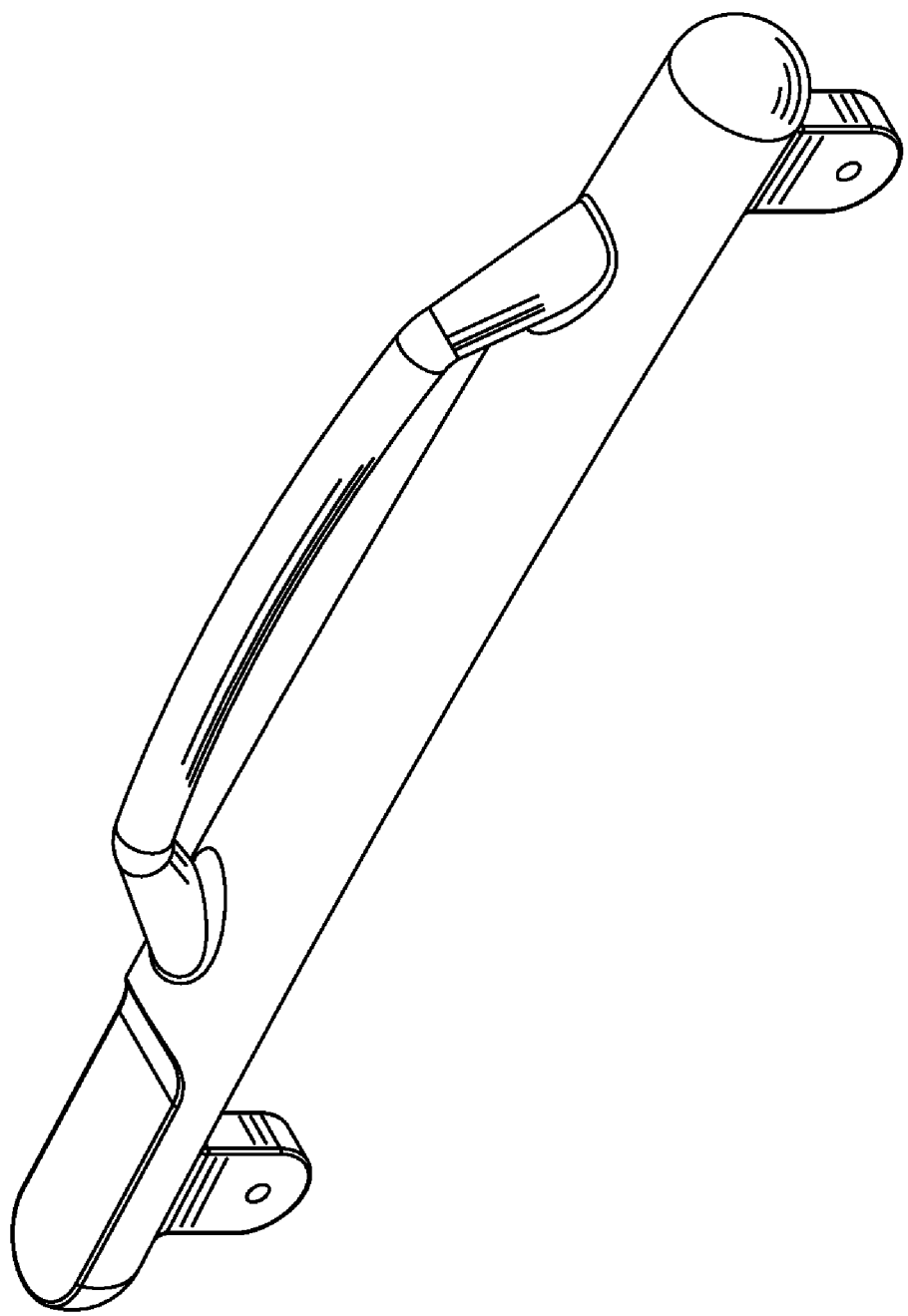
FIG. 12 is a perspective view of a gangway handrail in accordance with an embodiment of the present invention.
Figure 13:
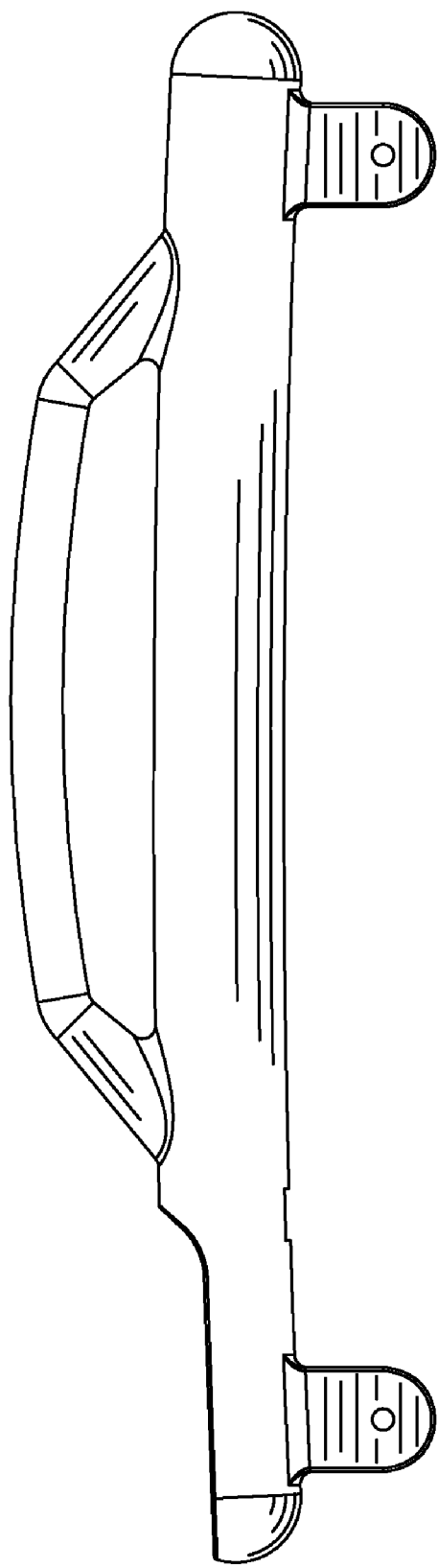
FIG. 13 is a side elevation view of the gangway handrail of FIG. 12.
Figure 14:
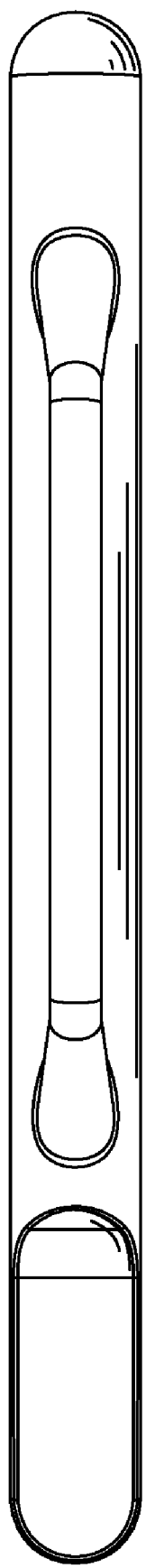
FIG. 14 is a top plan view of the gangway handrail of FIG. 12.
Figure 15:
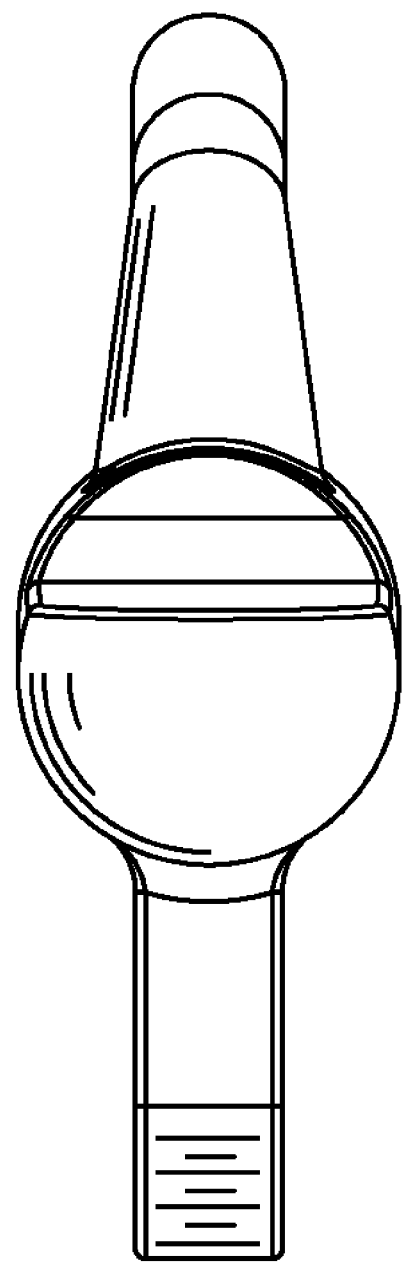
FIG. 15 is a front plan view of the gangway handrail of FIG. 12.
Figure 16:
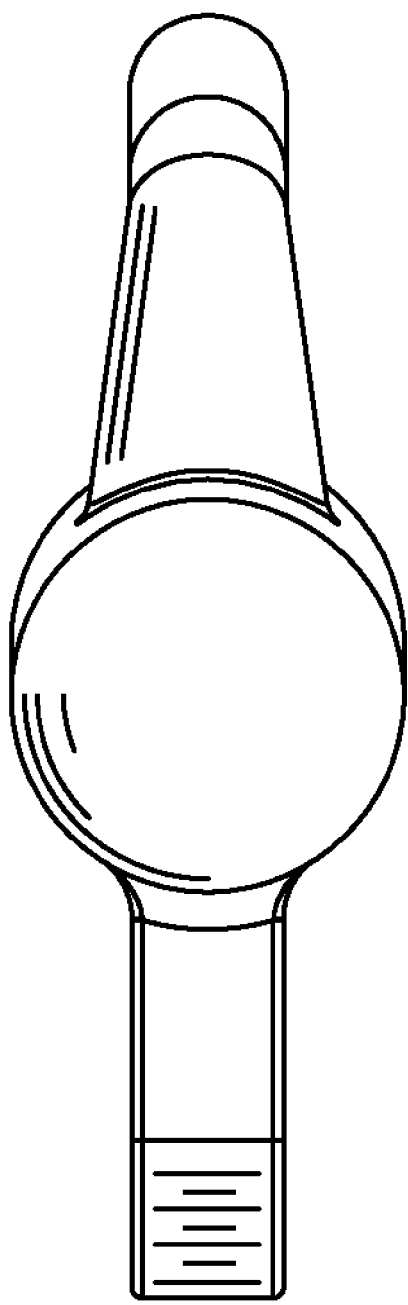
FIG. 16 is a rear plan view of the gangway handrail of FIG. 12.
Figure 17:
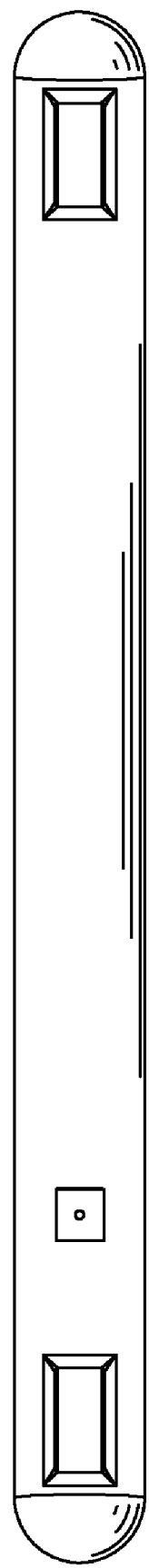
FIG. 17 is a bottom plan view of the gangway handrail of FIG. 12.

FIG. 5 is a flowchart illustrating an exemplary process for manufacturing a handrail for a gangway in accordance with an embodiment of the present invention. At step 500, stock metal is manipulated to form a mold comprising a cavity representative of a handrail. For instance, the mold comprises a cavity that can hold one of the gangway handrails illustrated in FIGS. 6 through 35 and described below with reference to FIG. 18.

At step 502, the cavity of the mold is filled with a polymer, such as polyethylene, polyvinyl chloride ("PVC"), or nylons. In a preferred embodiment, the mold is filled with cross-linked polyethylene. Although it should be understood by those of ordinary skill in the relevant art that any cross-linked polyethylene resin may be used, in this embodiment, the PAXON 7004 crosslinkable rotational molding powder resin offered by EXXONMOBIL CHEMICAL of Houston, Tex. is used. The powder resin is dry-blended with a pigment so that the handrail exhibits a noticeable color, such as bright orange, once created. It should be understood by those of ordinary skill in the art, however, that other colors may be used as desired.

At step 504, the mold is placed in an oven and heated to approximately 500 to 700° F. Preferably, the molds of the present invention are heated to approximately a range of 510 to 550° F. Once the polymer has melted, the mold is rotated biaxially about both its lateral and medial axes at step 506. In the presently-described embodiment, the molds are heated for approximately 30 to 35 minutes, but those of ordinary skill in the art should understand that this time may be altered depending on the shape and size of the mold, as well as external factors, such as the time of the year and the temperature of the ambient air. After the mold has been heated a sufficient amount of time, rotation terminates, and the mold is removed from the oven at step 508. The mold is then cooled at step 510 in order to allow the polymer to solidify and harden. In the presently-described embodiment, the molds are cooled by air and water spray for approximately 30 to 35 minutes. At step 512, the handrail is then removed from the mold and is one single, integral, continuous piece of plastic as a result of the rotational molding process. Process flow returns to step 502 in order to repeat the process described above so that additional handrails may be manufactured.

FIGS. 6 through 35 are exemplary views of handrails created from a rotational molding process in accordance with various embodiments of the present invention. As illustrated in FIGS. 6 through 35, handrails may exhibit different sizes, shapes, and configurations depending on the size, shape, and configuration of the gangway to which the handrail is to be connected. It should therefore be understood by those of ordinary skill in the art that the cavity of each mold corresponding to each respective handrail may exhibit the specific shape, size, and configuration of the respective handrail. It is preferable to create a mold for each handrail configuration so that the process described above may be repeated as needed. The handrails illustrated in FIGS. 6 through 35 vary with respect to size, shape, and configuration, and exhibit different embodiments of the present invention. Accordingly, while the following description is made with reference to FIG. 18, those of ordinary skill in the art should understand that the ensuing description is applicable to handrails of varying shapes, sizes, and configurations, including those illustrated in FIGS. 6 through 35.

Figure 18:
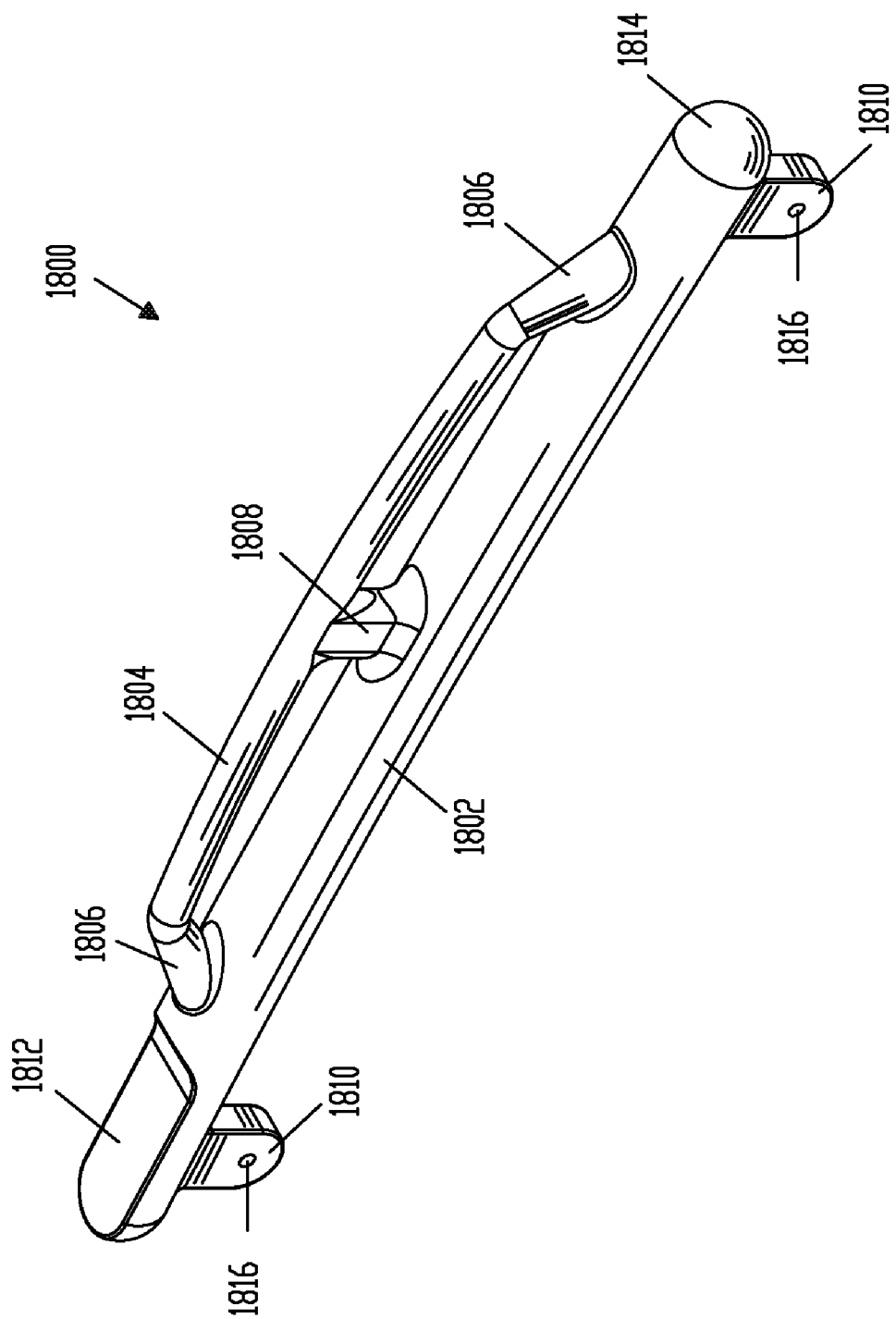
FIG. 18 is a perspective view of a gangway handrail in accordance with an embodiment of the present invention.
Figure 19:
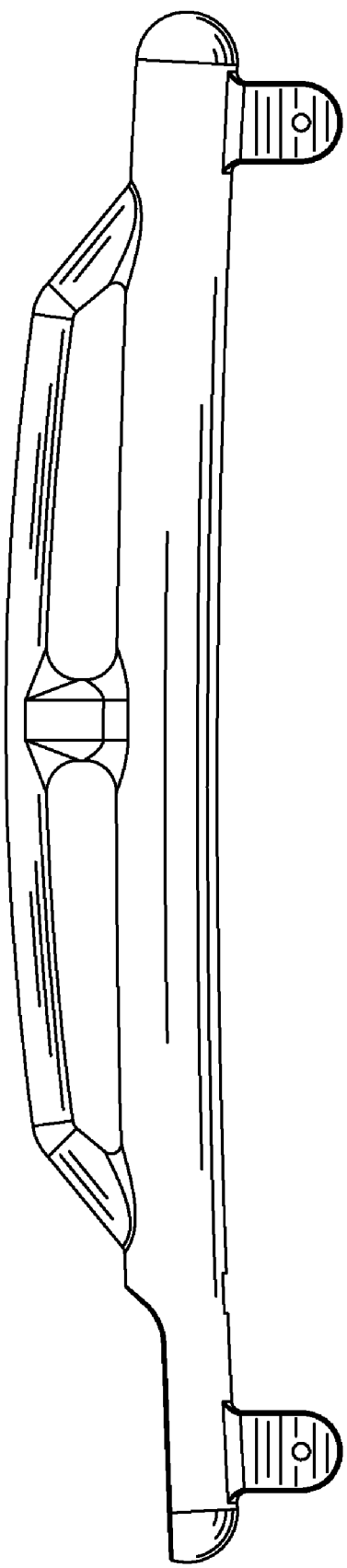
FIG. 19 is a side elevation view of the gangway handrail of FIG. 18.
Figure 20:
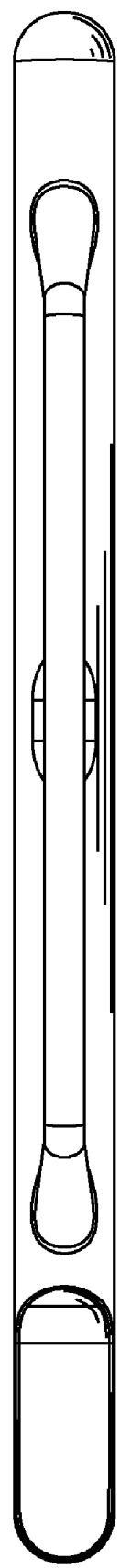
FIG. 20 is a top plan view of the gangway handrail of FIG. 18.
Figure 21:
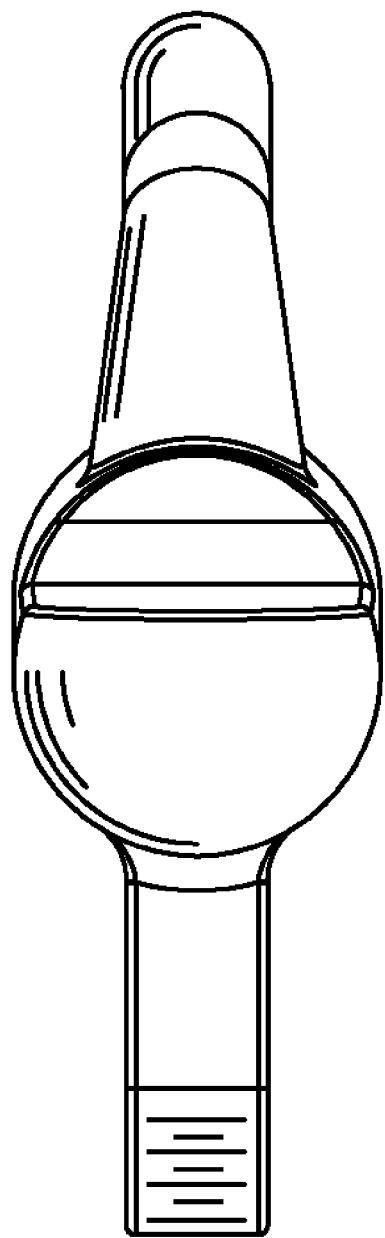
FIG. 21 is a front plan view of the gangway handrail of FIG. 18.
Figure 22:
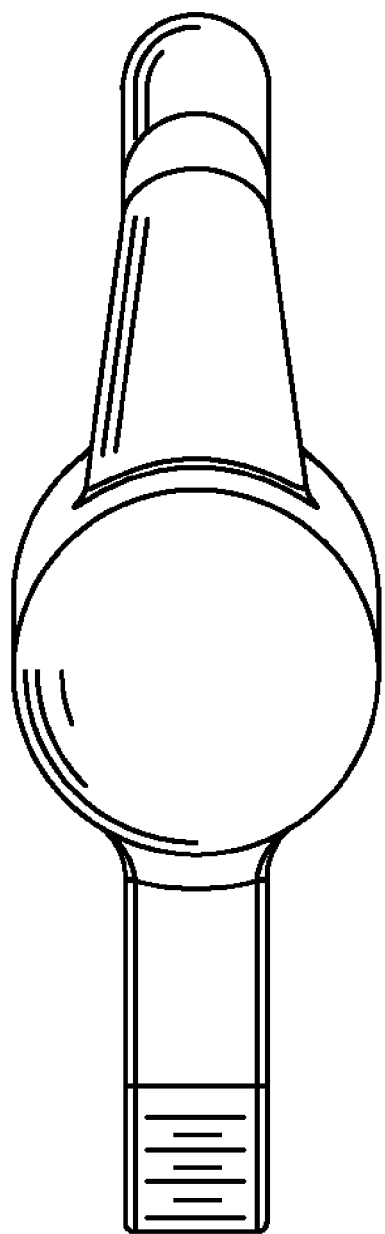
FIG. 22 is a rear plan view of the gangway handrail of FIG. 18.
Figure 23:
FIG. 23 is a bottom plan view of the gangway handrail of FIG. 18.
Figure 24:
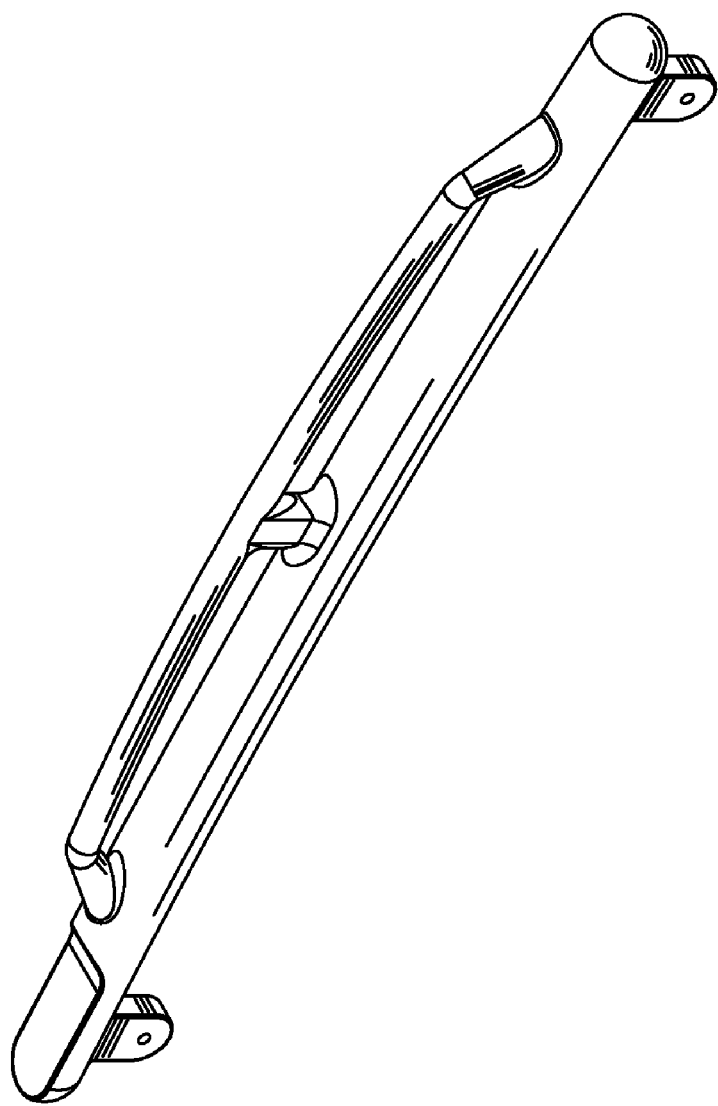
FIG. 24 is a perspective view of a gangway handrail in accordance with an embodiment of the present invention.
Figure 25:
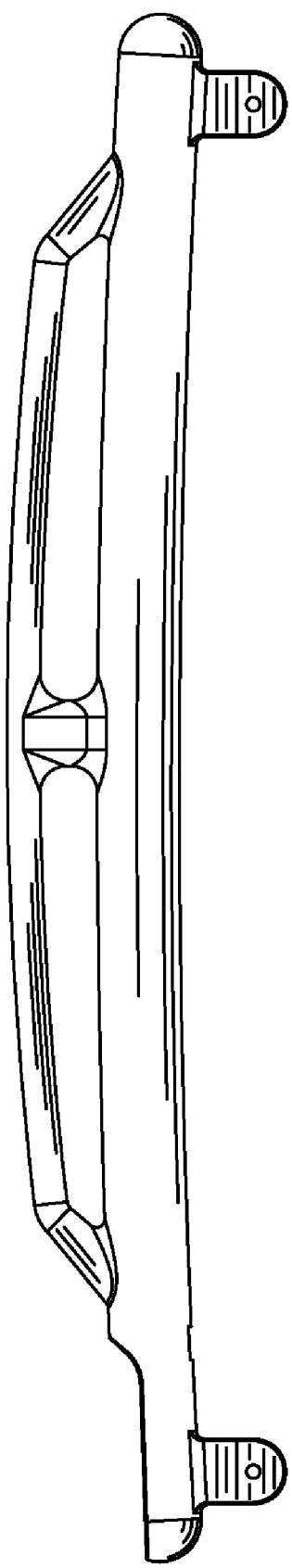
FIG. 25 is a side elevation view of the gangway handrail of FIG. 24.
Figure 26:
FIG. 26 is a top plan view of the gangway handrail of FIG. 24.
Figure 27:
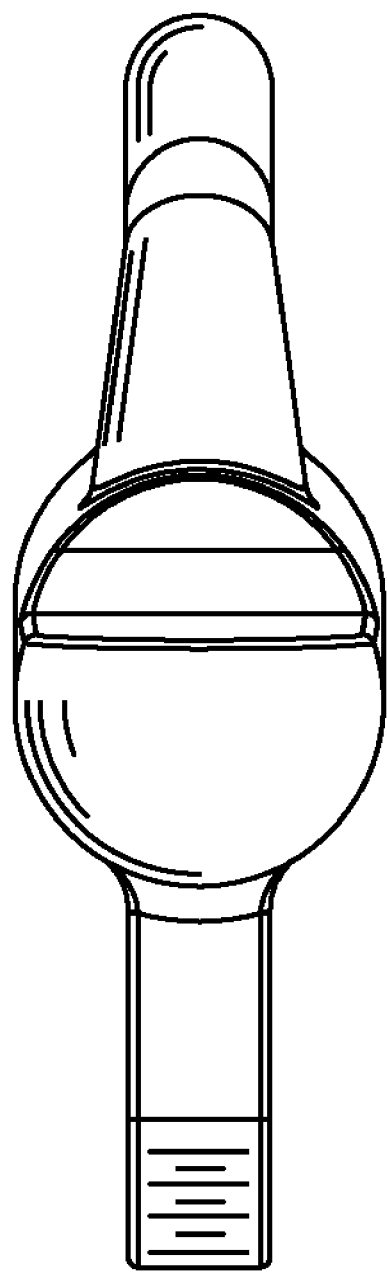
FIG. 27 is a front plan view of the gangway handrail of FIG. 24.
Figure 28:
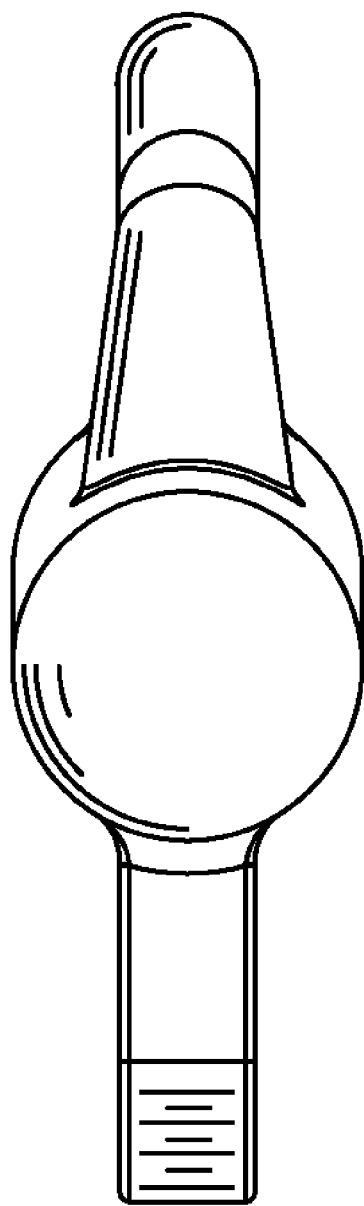
FIG. 28 is a rear plan view of the gangway handrail of FIG. 24.
Figure 29:
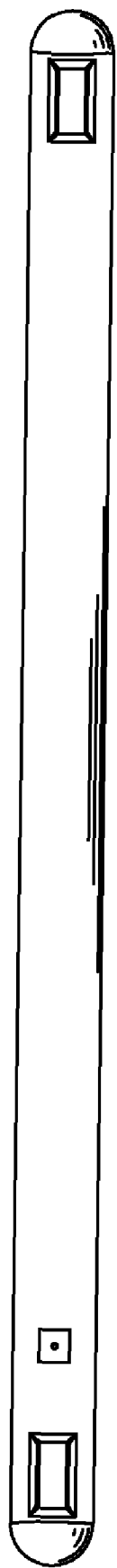
FIG. 29 is a bottom plan view of the gangway handrail of FIG. 24.
Figure 30:
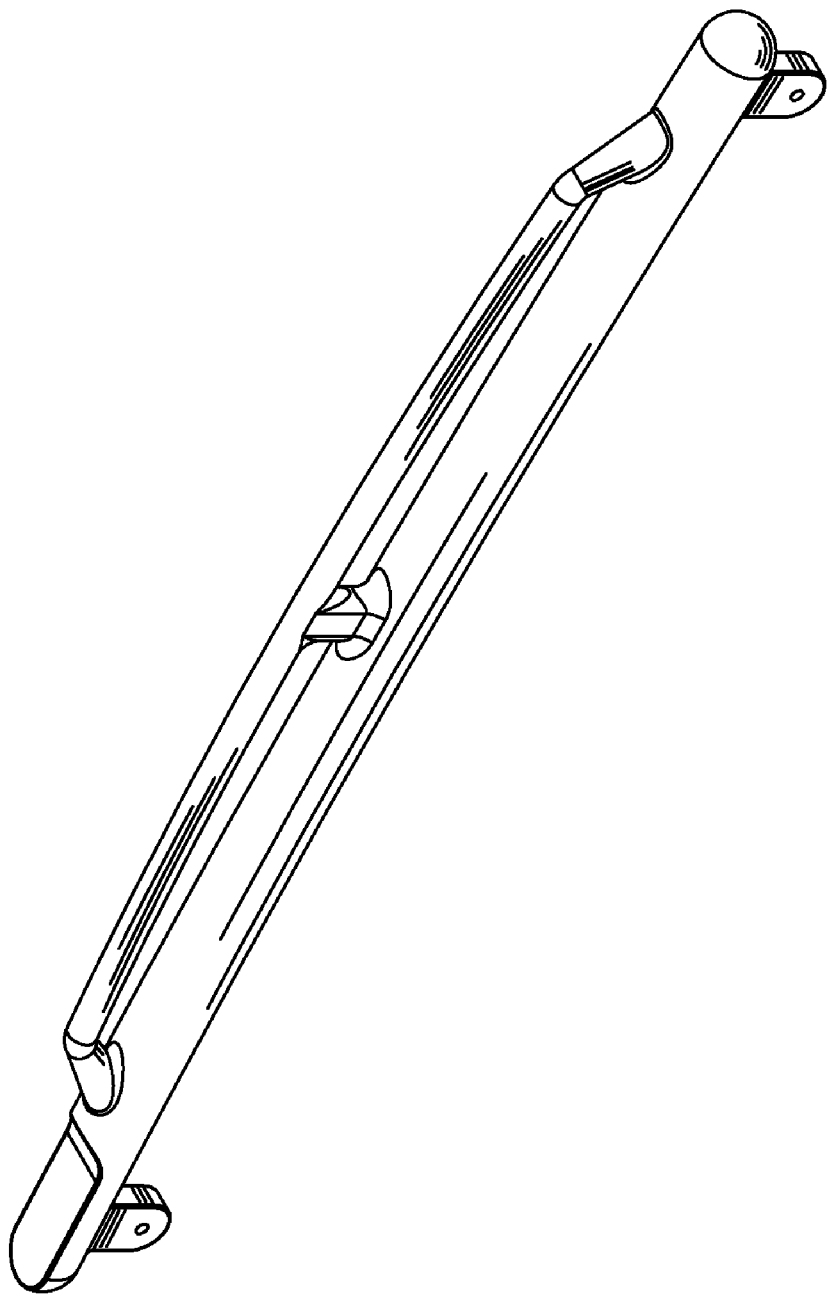
FIG. 30 is a perspective view of a gangway handrail in accordance with an embodiment of the present invention.
Figure 31:
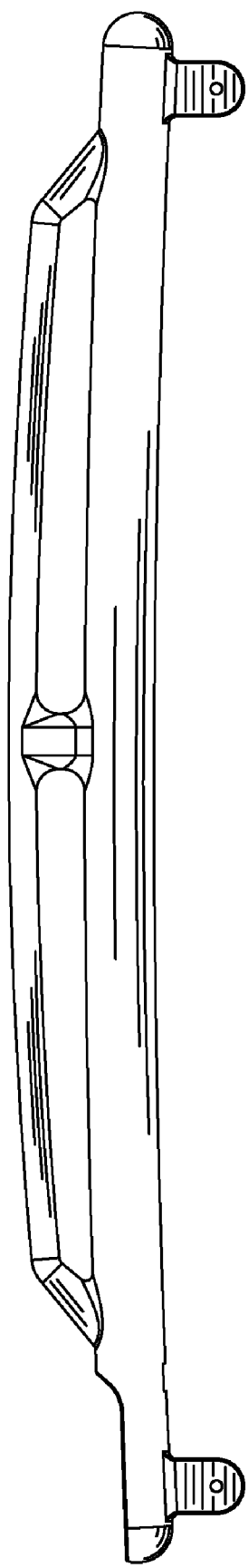
FIG. 31 is a side elevation view of the gangway handrail of FIG. 30.
Figure 32:
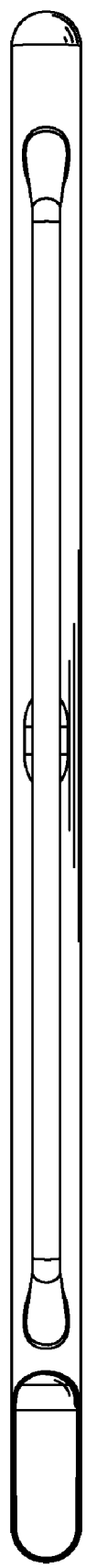
FIG. 32 is a top plan view of the gangway handrail of FIG. 30.
Figure 33:
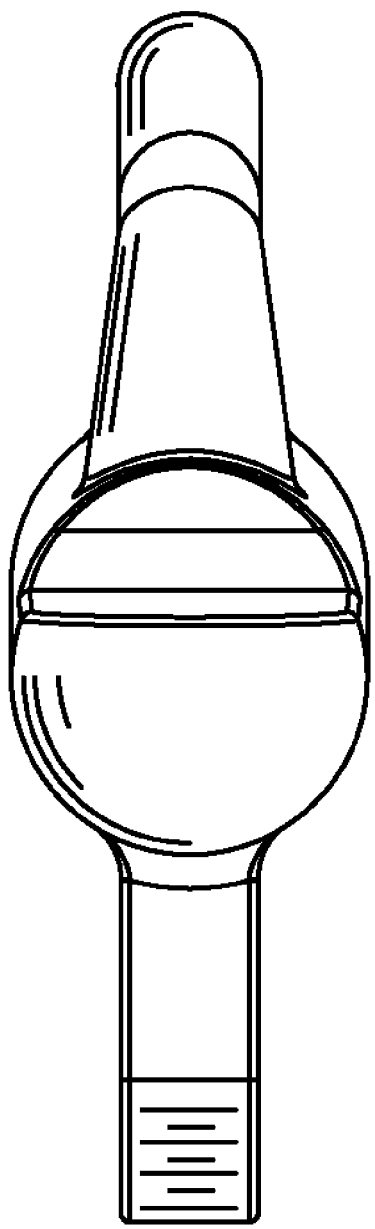
FIG. 33 is a front plan view of the gangway handrail of FIG. 30.
Figure 34:
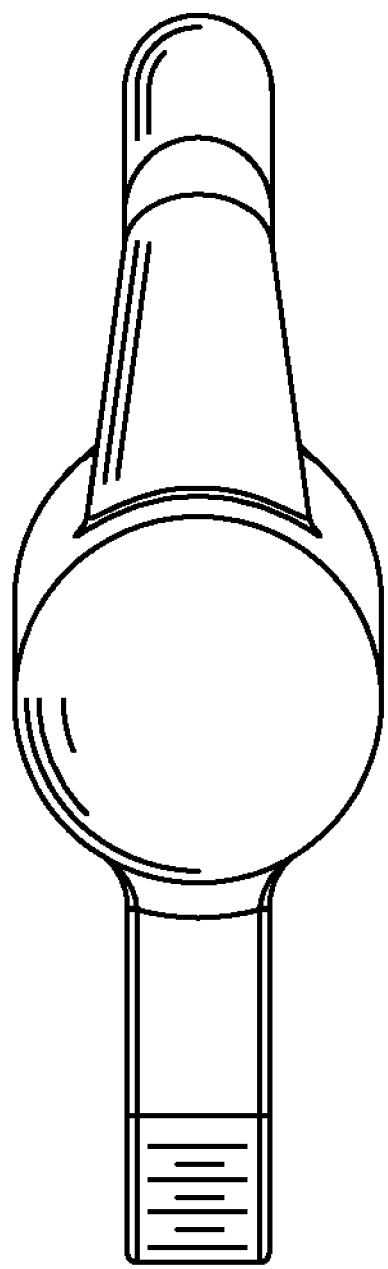
FIG. 34 is a rear plan view of the gangway handrail of FIG. 30.
Figure 35:
FIG. 35 is a bottom plan view of the gangway handrail of FIG. 30.

FIG. 18 is a perspective view of an exemplary handrail 1800 in accordance with an embodiment of the present invention. Handrail 1800 is created from the rotational molding process described above with respect to FIG. 5, and is therefore comprised of a single, continuous piece of plastic. Handrail 1800 comprises a main body portion 1802, an upper handle portion 1804, connections 1806 and 1808 between the two, and a pair of tabs 1810. A front end of main body portion 1802 defines a flat area 1812, while the opposite end defines a half spherical end 1814. Each of tabs 1810 defines a respective aperture 1816.

The mold used to create handrail 1800 using the rotational molding process forms connections 1806 and 1808 between upper handle portion 1804 and main body portion 1802. It should be understood by those of ordinary skill in the art, however, that middle connection 1808 may be unnecessary depending on the size and shape of the handrail. The mold also forms tabs 1810 and defines apertures 1816, into which bushings are pressed. Tabs 1810, apertures 1816, and the bushings are used to connect handrail 1800 to a gangway. That is, portions of the gangway are designed to receive or engage tabs 1810. Tabs 1810 are inserted into these portions and a connecting mechanism, such as a carriage bolt, rod, or pole, is inserted through one side of these portions, through apertures 1816, and through the other side of these portions. In this manner, handrail 1800 is connected to the respective gangway. Flat area 1812 is configured to provide clearance between handrail 1800 and portions of the gangway to which the handrail is connected that may have come into contact with main body portion 1802 had the entire main body portion exhibited a cylindrical shape.

The bushings inserted into apertures 1816 engage the connecting mechanisms in order to minimize any friction created between the handrail and the portions of the gangway to which they are connected. It is unnecessary to powder coat handrail 1800 at this point because it is plastic and the polymer used to create the handrail is preferably pre-compounded with the handrail's desired color. Moreover, because handrail 1800 is created from the rotational molding process, the portions of the handrail do not need to be sawed or cut from stock materials and welded together.

Those of ordinary skill in the art should understand that the above description discloses a handrail for a gangway manufactured by a rotational molding process. The handrail comprises a single, continuous piece of plastic. As a result, the materials, costs, and time associated with manufacturing a handrail for a gangway are reduced.

While one or more preferred embodiments of the invention have been described above, it should be understood that any and all equivalent realizations of the present invention are included within the scope and spirit thereof. The embodiments depicted are presented by way of example only and are not intended as limitations upon the present invention. Thus, it should be understood by those of ordinary skill in this art that the present invention is not limited to these embodiments since modifications can be made. Therefore, it is contemplated that any and all such embodiments are included in the present invention as may fall within the scope and spirit thereof.

What is claimed is:

1. A gangway comprising:
    an underbody support structure;
    a first support surface connected to an end of the underbody support structure, wherein a first support surface first upright extends from one side of the first support surface and a first support surface second upright extends from another side of the first support surface;
    a second support surface connected to another end of the underbody support structure, wherein a second support surface first upright extends from one side of the second support surface and a second support surface second upright extends from another side of the second support surface;
    a left handrail, wherein one end of the left handrail is connected to the first support surface first upright and another end of the left handrail is connected to the second support surface first upright; and
    a right handrail, wherein one end of the right handrail is connected to the first support surface second upright and another end of the right handrail is connected to the second support surface second upright, and the right handrail is a first single, continuous piece of plastic.

2. The gangway of claim 1 wherein the left handrail is a second single, continuous piece of plastic.

3. The gangway of claim 1 wherein the right handrail is manufactured via a rotational molding process.

4. The gangway of claim 2 wherein the left handrail is manufactured via a rotational molding process.

5. A handrail for a gangway comprising a single, continuous piece of plastic comprising:
    an elongated, generally cylindrical main body portion; and
    a first tab extending from the elongated, generally cylindrical main body portion, wherein the first tab is adapted to be received by a first portion of the gangway and defines a first aperture through which a first connecting mechanism is passed in order to connect the handrail to the gangway.

6. The handrail of claim 5 wherein the connecting mechanism is a rod.

7. The handrail of claim 5 wherein the elongated, generally cylindrical main body portion defines a flat area at one end of the elongated, generally cylindrical main body portion and a half spherical area at another end of the elongated, generally cylindrical main body portion.

8. The handrail of claim 5 wherein the single, continuous piece of plastic further comprises an elongated, generally cylindrical secondary body portion positioned relatively parallel to the elongated, generally cylindrical main body portion with respect to an axis of the elongated, generally cylindrical main body portion, wherein the elongated, generally cylindrical secondary body portion exhibits a first diameter less than a second diameter of the elongated, generally cylindrical main body portion, the elongated, generally cylindrical secondary body portion exhibits a first length less than a second length of the elongated, generally cylindrical main body portion, and the elongated, generally cylindrical secondary body portion is connected to the elongated, generally cylindrical main body portion.

9. The handrail of claim 5 wherein the single, continuous piece of plastic further comprises a second tab extending from the elongated, generally cylindrical main body portion, wherein the first tab is adapted to be received by a second portion of the gangway and defines a second aperture through which a second connecting mechanism is passed in order to connect the handrail to the gangway.

* * * * *